(12) United States Patent
Wadhwa et al.

(10) Patent No.: US 7,715,391 B1
(45) Date of Patent: May 11, 2010

(54) SYSTEM AND METHOD FOR OPTIMAL DELIVERY OF MULTICAST CONTENT

(75) Inventors: Sanjay Wadhwa, Acton, MA (US); Derek Harkness, Munich (DE)

(73) Assignee: Juniper Networks, Inc., Sunnyvale, CA (US)

( * ) Notice: Subject to any disclaimer, the term of this patent is extended or adjusted under 35 U.S.C. 154(b) by 96 days.

(21) Appl. No.: 12/183,882

(22) Filed: Jul. 31, 2008

(51) Int. Cl.
 *H04L 12/56* (2006.01)
(52) U.S. Cl. ..................................... 370/390
(58) Field of Classification Search ............... 370/390
 See application file for complete search history.

(56) References Cited

U.S. PATENT DOCUMENTS

2004/0090970 A1* 5/2004 Sanchez et al. ........... 370/397
2005/0053086 A1* 3/2005 Mehta et al. .............. 370/432

OTHER PUBLICATIONS

Network Working Group; A. Yegin; Y. Ohba; R. Penno; G. Tsirtsis; C. Wang, "Request for Comments: 4058, Protocol for Carrying Authentication for Network Access (PANA) Requirements", May 2005.
Network Working Group; A. Singh; R. Turner; R. Tio; S. Nanji, "Request for Comments: 3355, Layer Two Tunnelling Protocol (L2TP) Over ATM Adaptation Layer 5 (AAL5)", Aug. 2002.
Network Working Group; P. Calhoun; W. Lou; D. McPherson; K. Peirce "Request for Comments: 3308, Layer Two Tunneling Protocol (L2TP) Differentiated Services Extension", Nov. 2002.
Network Working Group; Y. T'Joens; B. Sales; P. Crivellari "Request for Comments: 3301, Layer Two Tunnelling Protocol (L2TP) ATM Access Network Extensions", Jun. 2002.
Network Working Group; V. Rataw; R. Tio; S. Nanji; R. Verma "Request for Comments: 3070, Layer Two Tunneling Protocol (L2TP) Over Frame Relay", Feb. 2001.
Network Working Group; P. Srisuresh, "Request for Comments: 2888, Secure Remote Access with L2TP", Aug. 2000.
Network Working Group; B. Aboba; G. Zorn "Request for Comments: 2809, Implementation of L2TP Compulsory Tunneling via RADIUS", Apr. 2000.
Network Working Group; W. Townsley; A. Valencia; A. Rubens; G. Pall; G. Zorn; B. Palter "Request for Comments: 2661, Layer Two Tunneling Protocol "L2TP"", Aug. 1999.
Network Working Group; K. Hamzeh; G. Pall; W. Verthein; J. Taarud; W. Little; G. Zorn "Request for Comments: 2637, Point-to-Point Tunneling Protocol (PPTP)", Jul. 1999.

(Continued)

*Primary Examiner*—Melvin Marcelo
(74) *Attorney, Agent, or Firm*—Sanford E. Warren, Jr.; Akin Gump Strauss Hauer & Feld (57) ABSTRACT

Methods and systems consistent with the present invention provide a way to provide optimal delivery of multicast content by retail ISPs in a wholesale aggregation network environment. A broadband network gateway dynamically informs an access node of a mapping between a multicast domain corresponding to the retail service provider, allowing the gateway to send multicast data to the access node for replication to subscribers instead of replicating the multicast data at the gateway. The gateway dynamically informs the access node of the mapping using a standardized access node control protocol. The gateway can also dynamically instruct the access node to update or delete the mapping.

23 Claims, 6 Drawing Sheets

OTHER PUBLICATIONS

Network Working Group; A Valencia; M. Littlewood; T. Kolar "Request for Comments: 2341, Cisco Layer Two Forwarding (Protocol) "L2F"", May 1998.

ANCP Working Group; H. Moustafa; H. Tschofenig; S. De Cnodder "Internet-Draft: Security Threats and Security Requirements for the Access Node Control Protocol (ANCP)", Apr. 9, 2008.

Working Group Name; S. Wadhwa; J. Moisand; S. Subramanian; T. Haag; N. Voigt, "Protocol for Access Node Control Mechanism in Broadband Networks", Jul. 14, 2008.

Network Working Group; S. De Cnodder; M. Morgenstern, "Internet Draft: Access Node Control Protocol (ANCP) MIB Module for Access Nodes", Jun. 24, 2008.

Network Working Group; S. Ooghe; N. Voigt; M. Platnic; T. Haag; S. Wadhwa; "Internet Draft: Framework and Requirements for an Access Node Control Mechanism in Broadband Multi-Service Networks", May 9, 2008.

Network Working Group; R. Aggarwal; M. Townsley; M. Dos Santos; "Request for Comments: 4719, Transport of Ethernet Frames over Layer 2 Tunneling Protocol Version 3 (L2TPv3)", Nov. 2006.

Network Working Group; W. Luo, "Request for Comments: 4667, Layer 2 Virtual Private Network (L2VPN) Extensions for Layer 2 Tunneling Protocol (L2TP)", Sep. 2006.

Network Working Group; S. Singh; M. Townsley; C. Pignataro, "Request for Comments: 4454, Asynchronous Transfer Mode (ATM) over Layer 2 Tunneling Protocol Version 3 (L2TPv3)", May 2006.

Network Working Group; M. Townsley; G. Wilkie; S. Booth; S. Bryant; J. Lau, "Request for Comments: 4591, Frame Relay over Layer 2 Tunneling Protocol Version 3 (L2TPv3)", Jul. 2006.

Network Working Group; C. Pignataro; M. Townlsey, "Request for Comments: 4349, High-Level Data Link Control (HDLC) Frames over Layer 2 Tunneling Protocol, Version 3 (L2TPv3)", Feb. 2006.

Network Working Group; G. Bourdon "Request for Comments: 4045, Extensions to Support Efficient Carrying of Multicast Traffic in Layer-2 Tunneling Protocol (L2TP)", Apr. 2005.

Network Working Group; J. Lau; M. Townsley; I. Goyret, "Request for Comments: 3931: Layer Two Tunneling Protocol—Version 3 (L2TPv3)", Mar. 2005.

Network Working Group; W. Townsley; R. Da Silva, "Request for Comments: 3817: Layer 2 Tunneling Protocol (L2TP) Active Discover Relay for PPP over Ethernet (PPPoE)", Jun. 2004.

Network Working Group; W. Palter; W. Townsley, "Request for Comments: 3437: Layer-Two Tunneling Extensions for PPP Link Control Protocol Negotiation", Dec. 2002.

Network Working Group; E. Caves; P. Calhoun; R. Wheeler, "Request for Comments: 3371: Layer Two Tunneling Protocol "L2TP" Management Information Base", Aug. 2002.

* cited by examiner

SYSTEM AND METHOD FOR OPTIMAL DELIVERY OF MULTICAST CONTENT

CROSS-REFERENCE TO RELATED APPLICATIONS

N/A

STATEMENTS REGARDING FEDERALLY SPONSORED RESEARCH OR DEVELOPMENT

N/A

REFERENCE TO A MICROFICHE APPENDIX

N/A

BACKGROUND OF THE INVENTION

1. Field of the Invention

The present invention generally relates to aggregation, and relates more particularly to dynamic aggregation for a plurality of protocols.

2. Description of the Related Art

Broadband access technologies such as digital subscriber lines (DSL) enable internet service providers (ISPs) to provide internet services to subscribers over data networks. Rather than deploying their own data networks, ISPs typically lease access to data networks from network access providers (NAPs). A NAP might be, for example, a company that owns fiber optic cables used in data transmission. Thus, there are multiple ISPs providing internet services over one NAP's network, called an intervening network, to thousand of subscribers. As such, it is typically necessary to track which ISP a subscriber subscribes to, or in other words, which ISP "owns" the subscriber.

Figure 1:
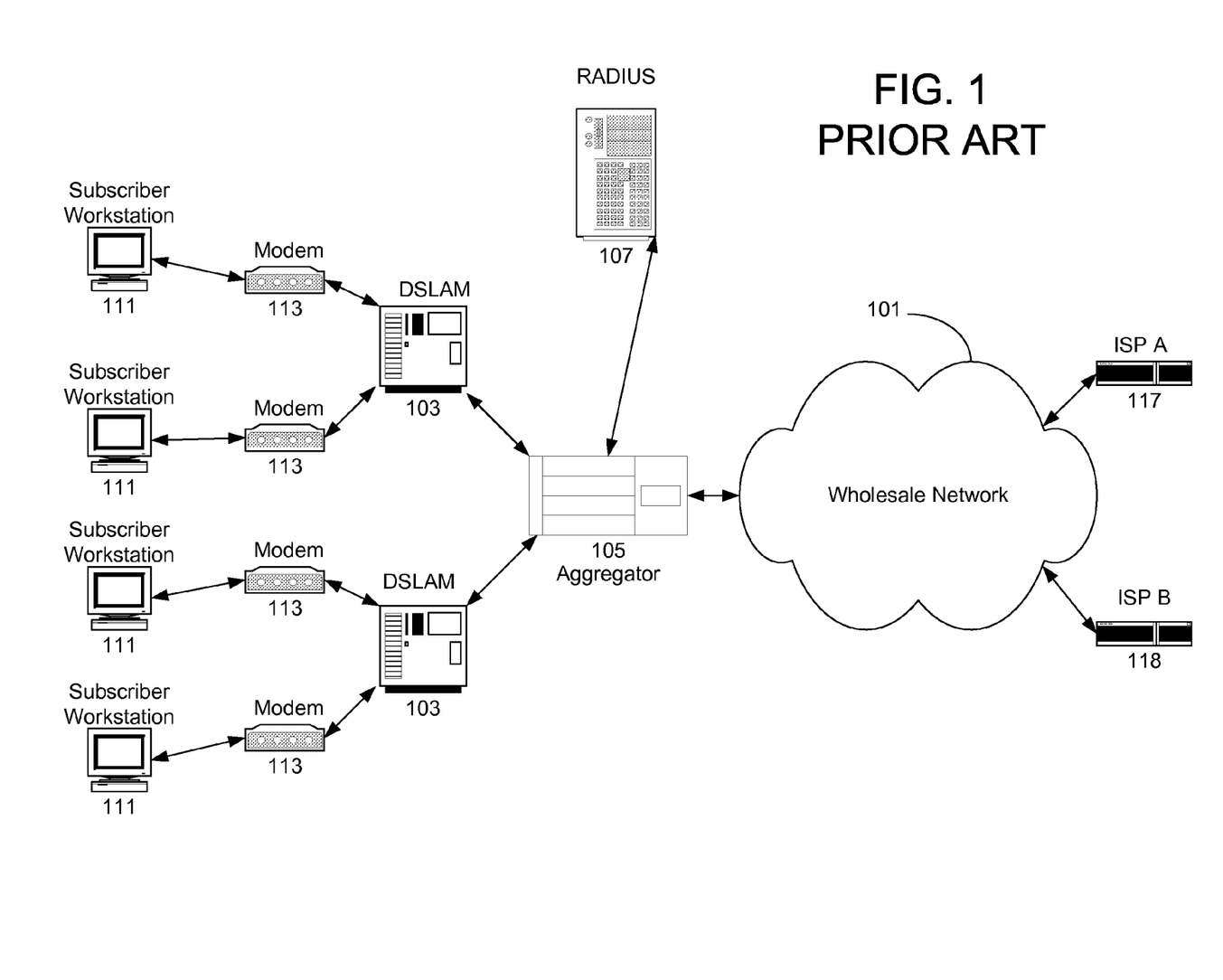
FIG. 1 is a block diagram illustrating a conventional wholesale-retail aggregation environment.

FIG. 1. illustrates a conventional network topology where multiple ISPs (ISP A 117 and ISP B 118) serve multiple subscribers over a single aggregation network. A subscriber uses subscriber workstation 111 to send a request for internet services from their ISP, for example, ISP A 117. This request is transmitted via DSL modem 113 to an aggregation point called a DSL Access Multiplexer (DLSAM) 103. These devices are used to aggregate multiple DSL lines, and are often located remotely from the access point such as in neighborhoods and around office buildings. The DSLAMs are connected at layer 2 of OSI to a network element referred to here as an "aggregator" 105. The aggregator aggregates connections from multiple DSLAMs, and potentially differentiates subscribers, authorizes and authenticates subscriber's access to the network, and either terminates the subscribers to provide services, or forwards the subscribers to a remote ISP that "owns" the subscriber.

When the subscriber 111 first connects, the aggregator 105 communicates with a Remote Authentication Dial-In User Service (RADIUS) server 107 to dynamically discover which ISP owns the subscriber 111. The RADIUS server 107 maintains a centralized repository of subscriber information including information about the ISP that owns the subscriber 111. The RADIUS server 107 returns the correct ISP information to the aggregator 105, and the aggregator tunnels a connection for the subscriber 111 through the intervening network 101 to the correct ISP. The RADIUS server 107 can provide dynamic mapping of subscribers to ISPs Where the retail ISP is providing multicast content to its customers, the wholesale-retail provider setup has prevented efficient transport of the multicast content. The wholesale network provider has typically had to send unicast data to the subscribers 111 from the aggregator 105 because of a lack of awareness of the multicast replication state closer to the subscriber. Although some attempts have been made to more efficiently traverse multicast traffic through the various networks, those attempts have assumed greater control and dependencies than are present in a wholesale-retail provider situation.

BRIEF SUMMARY OF THE INVENTION

Other systems, methods, features, and advantages consistent with the present invention will become apparent to one with skill in the art upon examination of the following figures and detailed description. It is intended that such additional systems, methods, features, and advantages be included within this description and be within the scope of the invention.

In one embodiment, a method of sending multicast data from a retail service provider to a subscriber of the retail service provider through a wholesale service provider comprises establishing a multicast domain by a wholesale service provider between a retail service provider and an access node; defining a mapping of a local loop to the multicast domain; sending the mapping of the local loop to the multicast domain to the access node from the wholesale service provider gateway; and sending multicast data from the retail service provider to the subscriber via the multicast domain.

In another embodiment, a method comprises dynamically obtaining a mapping of a local loop to a retail service provider multicast domain by a wholesale service provider gateway; sending the mapping to an access node associated with the local loop; receiving a subscriber multicast reception request from the access node for a subscriber connection via the local loop; telling the retail service provider to send requested multicast data via the multicast domain mapped to the local loop; and forwarding the multicast data to the access node to be sent via the local loop for the subscriber.

In another embodiment, a method comprises defining a multicast domain corresponding to a retail service provider and a local loop; defining a multicast channel lineup corresponding to the multicast domain; defining a multicast context as an association of the multicast domain and the corresponding multicast channel lineup; and sending the multicast context to an access node using a standardized access node control protocol from a wholesale service provider gateway in response to a request from a subscriber connected via the local loop.

BRIEF DESCRIPTION OF THE SEVERAL VIEWS OF THE DRAWINGS

The accompanying drawings, which are incorporated in and constitute a part of this specification, illustrate an implementation of methods and systems consistent with the present invention and, together with the description, serve to explain advantages and principles consistent with the invention. In the drawings.

DETAILED DESCRIPTION OF THE INVENTION

Some of the following disclosure is written using terminology related to the Layer 2 Tunneling Protocol, but the various disclosed embodiments are not limited to that protocol, which is used only as an example of an environment in which embodiments of the present invention can be implemented.

Although network and service providers can provision or otherwise statically map subscribers or local loops to network paths for the purpose of multicast traffic, such static mapping is inefficient and typically involves control by the aggregator of the network out to the local loop, which is generally not present in a wholesale-retail provider environment. The following describes a technique for dynamically mapping local loops and subscribers to provide optimal delivery of multi cast traffic.

To better understand the problems in conventional multicast delivery, some explanation of conventional delivery techniques is useful. Optimal delivery of multicast content in a Layer 2 Tunneling Protocol (L2TP) wholesale scenario typically involves a retail Internet Service Provider (ISP) providing multicast content, such as Internet Protocol Television (IPTV), streaming audio, or streaming video to its customers. These types of multicast content are exemplary and illustrative only, and any type of multicast content can be handled in the embodiments disclosed below.

The problem of optimal multicast delivery involves several dimensions. There is a need to send a single copy of the multicast stream from the L2TP Network Server (LNS) that is the retail ISP's gateway to the wholesale network to the L2TP Access Controller (LAC) of the wholesale provider regardless of the number of L2TP sessions that have asked for a particular multicast content.

Internet Group Management Protocol (IGMP) messages between subscribers and the provider that manages multicast groups terminate on the LNS. The LAC has no awareness if and where the multicast stream needs to be sent. The LAC needs to gain awareness of which multicast group needs to be replicated, without having to snoop IGMP of a retail ISP's customer.

There should be a logical separation of multicast domains per retail ISP in the access and aggregation network. The DSLAM does not know which retail ISP owns the subscriber. Only the LAC knows that information. But IGMP snooping on the DSLAM should create multicast replication state in the context of the correct multicast domain that corresponds to the retail ISP. This proper multicast replication can be difficult when overlapping source and group addresses are used between different retail ISPs.

Some proposals, such as RFC4058, Protocol for Carrying Authentication for Network Access (PANA) Requirements, have been developed to extend L2TP for carrying multicast. But those approaches are based on the LNS controlling the behavior of the LAC, which does not occur in the wholesale-retail environment, where these two elements are relatively independent. In addition, this approach fails to integrate with efficient delivery of content across the multicast aggregation network of the wholesale provider and the access nodes of the access network, which may be controlled by another entity.

Various embodiments disclosed herein provide solutions to these problems. The wholesale provider can create distinct multicast domains per each retail ISP in the aggregation network and in the access node (AN). The wholesale provider's RADIUS server can be configured to map subscribers to one or more multicast domains in the aggregation—AN network. In some embodiments, the multicast domain can be simply defined as a multicast virtual local area network (Multicast VLAN or MC-VLAN) per retail ISP. Then, when the subscriber logs in, the LAC, sometimes referred to as a Broadband Network Gateway (BNG) can authenticate the subscriber with the RADIUS server and additionally get the mapping of subscriber to multicast domain. The BNG performs the aggregation function in the network. The LAC can then inform the AN (typically the DSLAM) of the mapping using an access node control protocol, such as the ANCP protocol, as described below. The AN then snoops the subscriber's IGMP messages in the context of the multicast domain.

In some embodiments, between the LAC and the LNS, the wholesale provider can configure multicast virtual private networks (VPNs) in the multicast backbone network per retail ISP to provide separation of the multicast content per retail ISP.

At the DSLAM, the AN, also known as a routing gateway (RG), can fork the IGMP from subscribers, passing on per subscriber IGMP to the LNS over a Point to Point Protocol (PPP) or other protocol connection to the LNS, and an aggregate IGMP to the BNG on the multicast VLAN corresponding to the retail ISP that owns the subscriber. The AN learns the proper multicast VLAN to use for this traffic via an ANCP or other AN control protocol message from the BNG.

The LNS terminates the per-subscriber IGMP, allowing the LNS to do per-subscriber control operations such as quality of service (QOS) adjustment, statistics, accounting, access, and admission control.

The LAC on receiving the aggregate IGMP at the BNG over the multicast VLAN can then generate the appropriate messages to join the multicast group, typically a PIM JOIN, sending the messages to the appropriate retail ISP's LNS. On the LNS, the PIM JOIN triggers multicast data to be sent on the appropriate multicast VPN in the backbone network between the retail ISP and the wholesaler LAC. The wholesaler LAC then passes the multicast content data on the correct multicast VLAN for the multicast domain over the aggregation/access network to the DSLAM. The DSLAM's replication state information is then used to forward the multicast data to the correct subscribers.

The techniques described briefly above do not require any special or non-standard interaction between the LNS and the LAC for the multicast content delivery offered by the retail ISP. Each retail ISP's multicast content is isolated in all parts of the network paths between the subscribers and the retail ISP. No static configuration or provisioning of the DSLAMs is required to tell the DSLAMs which retail ISP owns a given subscriber; instead, the access node control protocol provides a dynamic mechanism to make the association to enable the DSLAMs to deliver the multicast content.

Figure 2:
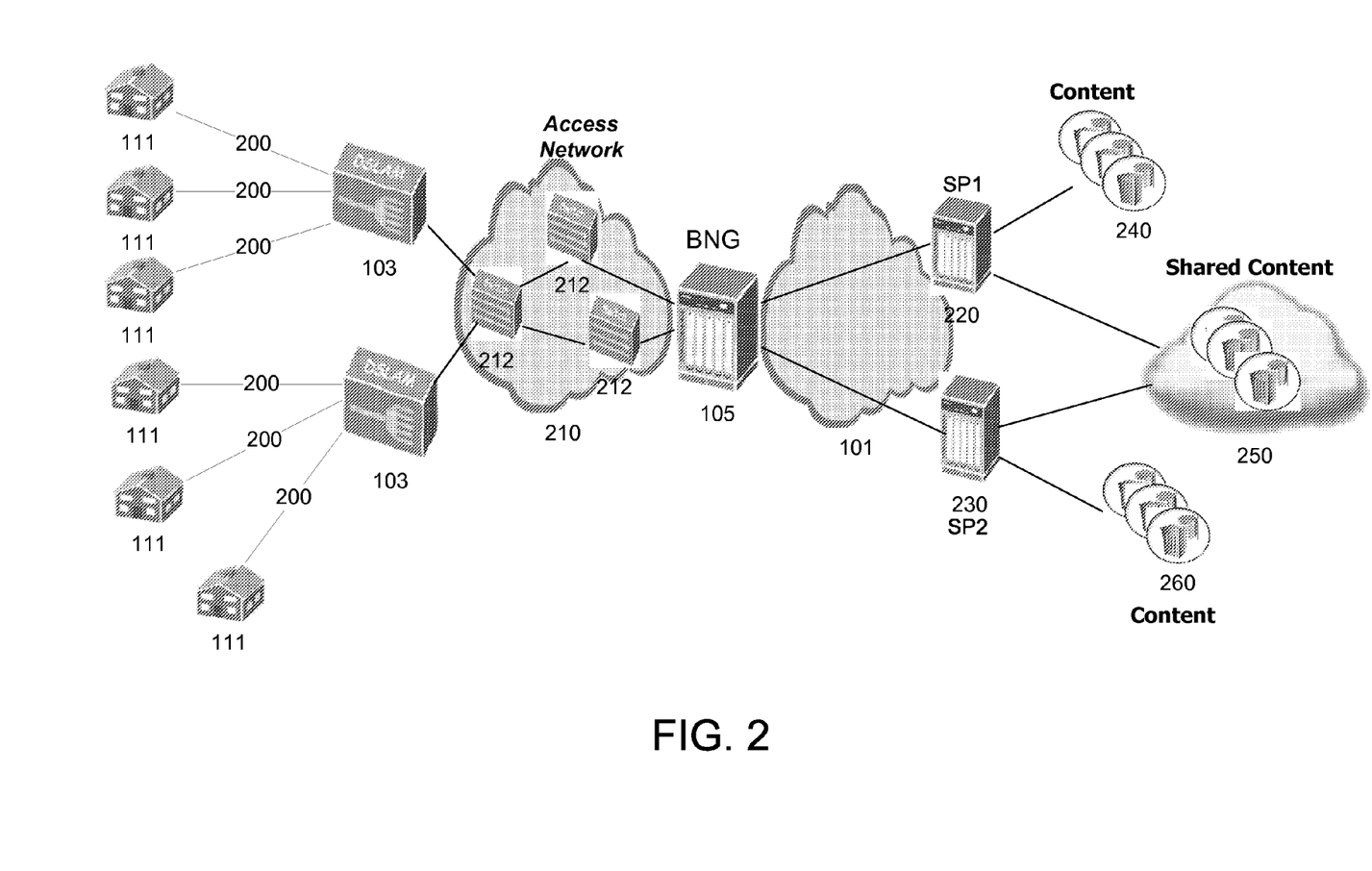
FIG. 2 is a block diagram illustrating a wholesale-retail networked environment according to one embodiment.

Turning now to FIG. 2, a block diagram illustrates one embodiment of such a system. Each Subscriber 111 is connected to an access node 103, in this embodiment a DSLAM via a local loop 200, which typically is a DSL line provided by a local exchange company (LEC). The term "local loop" does not require that the physical layout of the local loop 200 be in the form of a loop, but is a generic term for any technique for bringing service the "last mile" to the subscriber 111. Conventional copper wire, fiber optic cable, or any other desired technology can be used for the local loop 200. In many situations, the local loop 200 has a one-to-one mapping to the subscriber 111, but in some situations, multiple subscribers 111 can share a single local loop 200.

The AN 103 is connected to the BNG 105, sometimes referred to as a Broadband Remote Access Server (BRAS). The BNG 105 is typically a device such as a Juniper Networks ERX-1440 or a similar class of network device. The AN 103 and BNG 105 are connected by an access network 210, which frequently is comprised of a networked collection of asynchronous transfer mode (ATM) switches 212, using ATM transport protocols to communicate between the AN 103 and the BNG 105. The use of ATM switches and transport is exemplary and illustrative only, and the access network can use other technology to connect the AN 103 and BNG 205.

In FIG. 2, the BNG 105 is in turn connected to retail ISP servers 220 and 230, representing 2 LNSes corresponding to two retail ISPs. As shown in FIG. 2, one retail ISP has an LNS 220 that is capable of providing content 240 and content 250. A second retail ISP has an LNS 230 that is capable of providing content 260 and content 250. While content 240 is unique to LNS 220 and content 260 is unique to LNS 230, content 250 is shared and can be provided by both LNS 220 and LNS 230, so the subscribers to either retail ISP can receive content 250.

In some embodiments, such as in Europe, regulatory policy requires network providers to provide wholesale services. A subscriber may choose to connect to any one of a plurality of retail ISPs simply by logging in with different login information. The wholesale network provider does not want the retail ISP to be able to control the wholesale network and vice versa. Organizations such as the Internet Engineering Task Force (IETF) and the DSL Forum have and continue to develop protocols for use in this wholesale-retail environment.

One such protocol is a protocol to allow control over the ANs 103 connected to the BNG 105 via the access network 210. The Access Node Control Protocol (ANCP) was originally developed by the DSL Forum and called the Layer 2 Control (L2C) protocol, but was renamed by the IETF to ANCP.

ANCP is a message passing protocol that is an extension of the General Switch Management Protocol defined by RFC 3293, with extensions to allow use in a broadband environment. ANCP allows the BNG 105 to send messages to the DSLAMs that serve as ANs 103 to tell the ANs 103 about network topology and other information. Embodiments disclosed herein would extend the defined messages of ANCP to allow the BNG 105 to inform the AN 103 about the correspondences between the subscribers 111, the LNSes 220 and 230, and the BNG 105, to allow efficient replication of unicast streams as close to the subscribers 111 as possible, i.e., at the ANs 103. ANCP is only an exemplary and illustrative access node control protocol. Other access node control protocols can be used for this BNG 105 to AN 103 communication about multicast domains.

Figure 3:
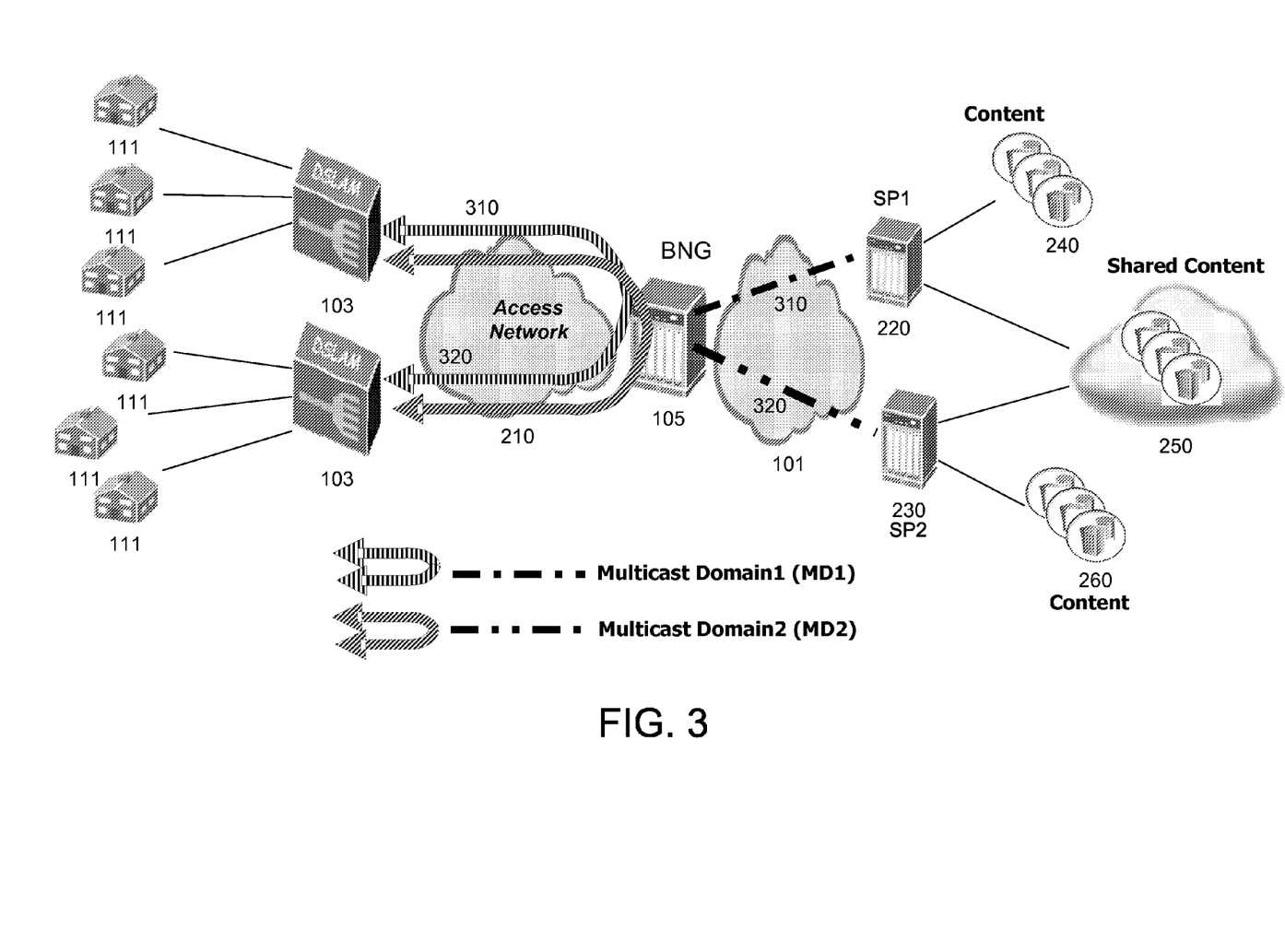
FIG. 3 is a block diagram illustrating a plurality of multicast domains in the embodiment of FIG. 2.

Turning now to FIG. 3, the multicast domains that allow efficient multicast transport are indicated. BNG 105 establishes a multicast domain 310 for multicast traffic from service provider 220 and a multicast domain 320 for multicast traffic from service provider 230. Note that as shown in FIG. 3, both DSLAMs 103 received multicast traffic for both multicast domains 310 and 320. A separate multicast domain is established for each retail ISP or service provider 220 and 230.

In one embodiment, each multicast domain is provisioned with an associated "channel lineup" on the ANs 103. The channel lineup is a set of multicast source and group addresses that can include wildcards. Examples of channel lineups are {Source, Group-range}, a list of {Source, Group}, {*, Group-range or a list of groups}, {*, *}, etc. These examples are illustrative only, and the format and control of the channel lineup can be varied as desired.

This multicast domain configuration allows for overlapping multicast group G among retail ISPs, which can eliminate the need for segmenting multicast address space per retail ISP, reducing the administrative burden on the wholesale provider and the BNG 105. With Source Specific Multicast (SSM), the group space does not need to be unique per retail ISP, but the source address space cannot be overlapping. Therefore, use of distinct multicast domains for retail ISP is preferable even with SSM-capable clients and networks, because the separation allows efficient per retail ISP traffic management, billing, bandwidth tracking, and content isolation.

Figure 4:
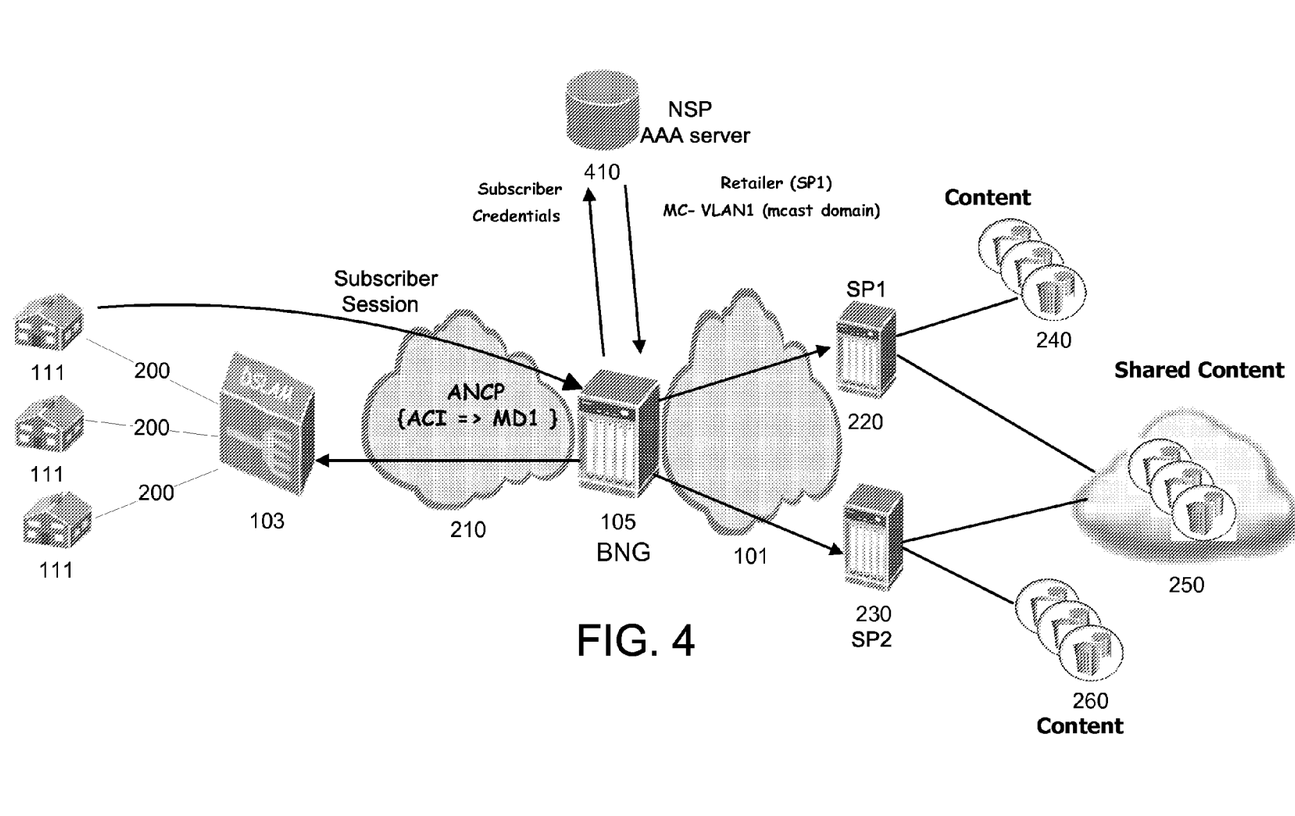
FIG. 4 is a further block diagram illustrating additional features of the embodiment of FIG. 2.

FIG. 4 illustrates one embodiment that allows dynamically mapping the local loop or Agent Circuit Identifier (ACI) to one or more multicast domains. As shown in FIG. 4A, Authentication and Authorization (AAA) server 410, typically a RADIUS server, helps provide this mapping. An ISP selection is triggered by a subscriber 111 initiating a subscriber session request. While authenticating the subscriber 111 to the BNG 105, the AAA server 410 performs a RADIUS lookup. The concept of ISP selection via RADIUS is extended to include lookup of the multicast domain per retail ISP. This dynamic mapping of local loop 200 to multicast domains is then made available to the AN 103 by the BNG 105.

The set of multicast domains along with their respective channel lineups form a multicast context corresponding to a local loop 200. The BNG 105 uses an access node control protocol such as ANCP to download the dynamic mapping between local loop 200 and a set of multicast domains, obtained from the AAA server 410 at authentication time. Because (as explained in more detail below with respect to FIG. 5) a local loop 200 may be serviced by multiple retail ISPs, the local loop to multicast domain mapping may not be one-to-one, but may be one-to-many. One example of a scenario where such a one-to-many local loop to retail ISP mapping can occur is where there are multiple subscribers on a single local loop 200, each being serviced by a different retail ISP.

Figure 5:
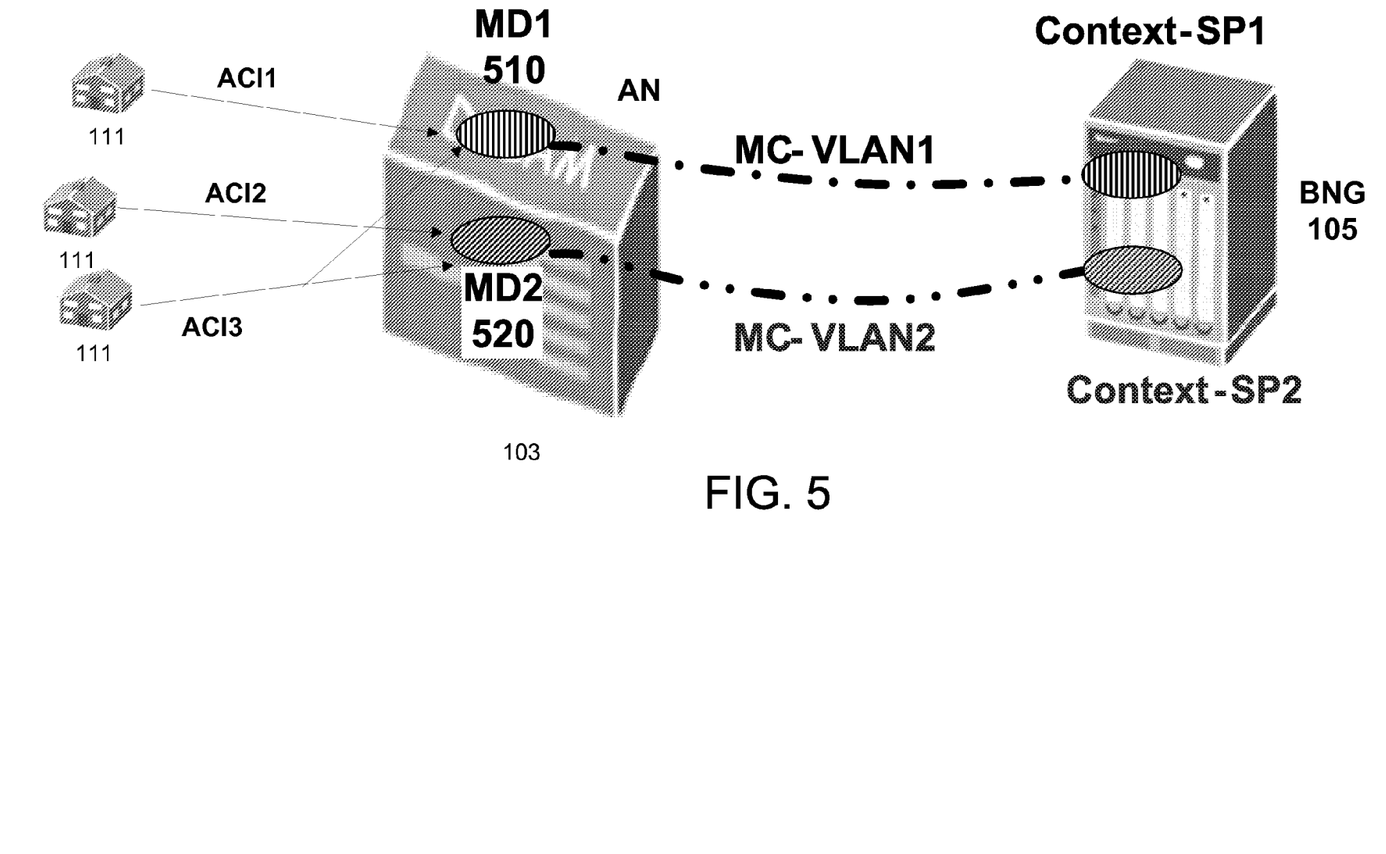
FIG. 5 is a block diagram illustrating communication between a broadband network gateway (BNG) and an access node according to one embodiment.

FIG. 5 illustrates such a scenario. Subscribers 111 are connected via three local loops ACI1, ACI2, and ACI3. Subscriber 111 connected via local loop ACI3 is associated with two multicast domains 510 and 520, while subscribers 111 connected via local loops ACI1 and ACI2 are associated with or mapped to multicast domains 510 and 520 respectively. Multicast domain 510 is associated with the VLAN MC-VLAN1, while multicast domain 520 is associated with VLAN MC-VLAN2, allowing the BNG 105 to send multicast traffic for each multicast domain 510 and 520 separately. Multicast contexts SP1 and SP2 correspond to multicast domains 510 and 520, respectively, together with their respective associated channel lineups.

When AN 103 snoops IGMP received on an AN port from a subscriber 111, the AN 103 finds the associated multicast domain in a local loop-to-multicast domain mapping table stored by the AN 103. The format and storage techniques used by the AN 103 can be any desired format and storage techniques, thus the lookup technique in the table can be any convenient desired lookup technique. Describing the stored ACI-to-multicast domain mapping as a table does not imply any particular storage technique or arrangement.

If the lookup determines only a single multicast domain corresponds to a given local loop, then the AN 103 can create or update the replication state for that multicast domain to include the local loop and initiate aggregate IGMP messages in the context of the corresponding VLAN. For example, in FIG. 5, the subscriber 111 connecting via local loop ACI1 is mapped solely to multicast domain 510 and the replication state for multicast domain 510 will include ACI 1.

But where the ACI-to-multicast domain mapping is one-to-many, such as for the subscriber 111 connected via local loop ACI3, the lookup results in multiple multicast domains. To decide which multicast domain to use, the AN 103 further looks up one or both of the source and group information provided by the subscriber 111 in the IGMP message in a multicast dispatch table (the multicast context) that associates the channel lineup with each multicast domain 510 and 520.

That lookup should narrow the result to a single multicast domain. So in FIG. 5, the AN 103 determines which of multicast domains 510 or 520 should be used for the requested multicast traffic to the subscriber 111 connected via local loop ACI3 by determining whether multicast domain 510 or 520 has the requested source and group in its channel lineup. Once AN 103 has determined the correct unique multicast domain for the requested multicast traffic, the AN 103 will create or update that replication state for that traffic to send it over local loop ACI3, and initiate IGMP (aggregate) in the multicast context of the corresponding multicast domains to the BNG 105 to ensure the BNG 105 replicates the desired multicast traffic over the selected multicast domain.

Figure 6:
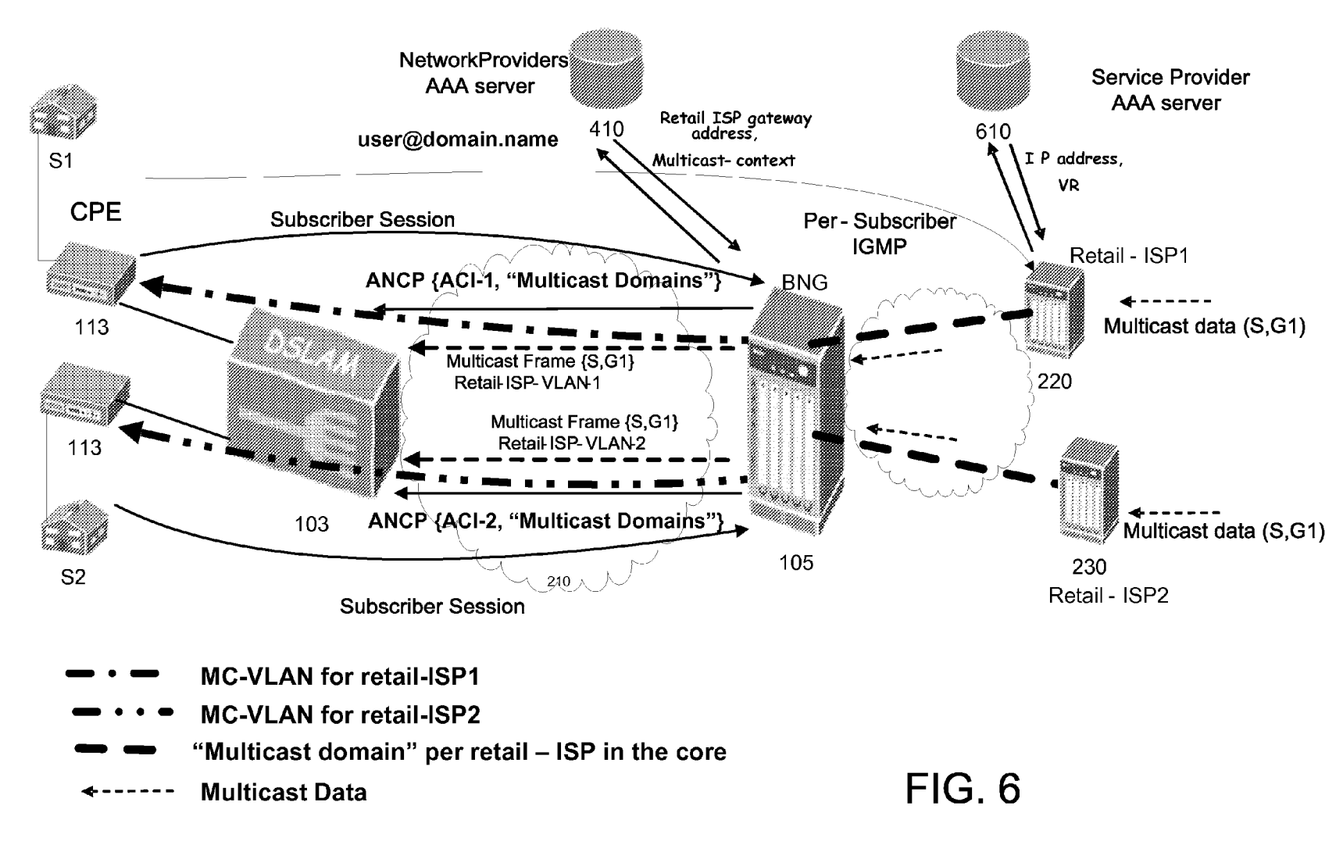
FIG. 6 is a block diagram illustrating data flows across a wholesale-retail environment according to one embodiment.

Putting the whole picture together in FIG. 6, subscriber S1 is connected by a CPE 113 such as a DSL modem over a local loop to an AN 103, such as a DSLAM. The subscriber S1 starts its session, typically as a PPP or IP session. The AN 103 acts as an intermediate relay, and inserts ACI information into the PPPoE tags or DHCP option 82. The subscriber information is passed to the BNG 105, which authenticates the subscriber S1 using the wholesale provider's AAA server 410. The AAA server 410 returns authentication information, as well as multicast context information and the retail ISP's gateway server address to the BNG 105. If not already created, the BNG 105 creates a multicast domain for retail ISP 220 or 230 as requested by subscriber S1. The BNG 105 notifies the AN 103 of the mapping between the multicast domain and the local loop for subscriber S1, using an extension to ANCP or another access node control protocol. The BNG 105 also sets up the multicast domain, as shown in FIG. 6, retail-ISP-VLAN-1. The AN 103 then stores the mapping of local loop to multicast domain, over which the multicast data will be replicated by the BNG 105 to the AN 103 for the subscriber S1. A similar dynamic mapping is performed when subscriber S2 connects, using multicast domain retail-ISP-VLAN-2.

The AN 103 snoops IGMP messages from subscribers S1 and S2. Based on the local loop and channel requested by the subscribers S1 and S2, the AN 103 will look up or check the associated multicast context to determine which multicast domain (retail-ISP-VLAN-1 or retail-ISP-VLAN-2) will be used for the traffic to be replicated to each subscriber over their local loop. The AN 103 then creates or updates the replication state in context of the multicast domain. The BNG 105 receives multicast data from retail ISP 220 or 230 over an IP connection between the BNG 105 and the respective retail ISP's server, depending on which retail ISP is providing the multicast data for the subscriber. The BNG 105 then replicates each multicast stream on the associated multicast domain, using the appropriate MC-VLAN, to the AN 103. When the multicast data is received on the multicast VLAN, the AN 103 replicates it to the appropriate subscriber or subscribers on the local loop associated with the multicast domain. This allows the BNG 105 to send a single multicast stream to the AN 103 for all of the subscribers requesting it, instead of the BNG 105 having to replicate the multicast data as separate unicast streams to each subscriber, allowing a more optimal distribution of multicast data across the wholesale provider's network. As subscribers S1 and S2 stop receiving the multicast traffic, the BNG 105 can instruct the AN 103 to delete the relevant local loop to multicast domain mapping. The BNG 105 can also send updates to the mapping to the AN 103 as needed.

The use of an access node control protocol such as ANCP to inform the AN 103 of the mapping between local loops and multicast domains is independent of the nature of the subscriber session and the local loop. Nor does the use of the access node control protocol depend on how the AN 103 and the BNG 105 transport data to each other.

If the wholesale provider network is an L2 aggregation network, and the wholesale provider does not require snooping on the L2 aggregation element, then a single MC-VLAN can be configured between the BNG 105 and the AN 103 as a "stacked VLAN." The multicast stream forwarded by the BNG 105 contains the base MC-VLAN information as the outer VLAN, and the retail-ISP-VLAN as the inner VLAN. Separate multicast domains are still configured for each inner VLAN and identified to the AN 103 using the access node control protocol. The AN 103 snoops IGMP from a subscriber in the context of the VLAN stack, i.e., {MC-relay retail-ISP-VLAN}. The intermediate L2 switches in the aggregation network can forward the traffic based on the outer VLAN to the AN 103 without having to configure separate MC-VLANs, reducing the total number of MC-VLANs that need to be configured in the aggregation network. But the BNG 105 is still able to efficiently replicate the multicast data using the inner VLANs, because the AN 103 is informed of the mapping between the local loop and the inner VLAN.

While there has been illustrated and described embodiments consistent with the present invention, it will be understood by those skilled in the art that various changes and modifications may be made and equivalents may be substituted for elements thereof without departing from the true scope of the invention. Therefore, it is intended that this invention not be limited to any particular embodiment disclosed, but that the invention will include all embodiments falling within the scope of the appended claims.

We claim:

1. A method of sending multicast data from a retail service provider to a subscriber of the retail service provider through a wholesale service provider, comprising:
    establishing a multicast domain by a wholesale service provider gateway that defines a path between a retail service provider and an access node;
    defining a mapping of a local loop to the multicast domain;
    sending the mapping of the local loop to the multicast domain to the access node from the wholesale service provider gateway; and
    sending multicast data from the retail service provider to the subscriber via the multicast domain.

2. The method of claim 1, wherein the multicast domain is a multicast virtual local area network.

3. The method of claim 1, further comprising:
    associating a plurality of multicast channels with the multicast domain.

4. The method of claim 1, further comprising:
    storing the mapping of the local loop to the multicast domain on an authentication server;

identifying the subscriber connecting via the local loop by the authentication server; and sending the mapping to the wholesale service provider gateway.

5. The method of claim 1, wherein the local loop is mapped to a plurality of multicast domains, each corresponding to one of a plurality of retail service providers.

6. The method of claim 1, further comprising:
instructing the access node to delete the mapping of the local loop to the multicast domain.

7. The method of claim 1, wherein sending the mapping of the local loop to the multicast domain to the access node from the wholesale service provider gateway is performed using a standardized access node control protocol.

8. A method, comprising:
Dynamically obtaining a mapping of a local loop to a retail service provider multicast domain by a wholesale service provider gateway;
sending the mapping to an access node associated with the local loop;
receiving a subscriber multicast reception request from the access node for a subscriber connected via the local loop;
telling the retail service provider to send requested multicast data via the multicast domain mapped to the local loop; and
forwarding the multicast data to the access node to be sent via the local loop for the subscriber.

9. The method of claim 8, further comprising:
instructing the access node to delete the mapping.

10. The method of claim 8, wherein the retail service provider multicast domain is a multicast virtual local area network associated with the retail service provider.

11. The method of claim 8, wherein sending the mapping to an access node associated with the subscriber comprises:
sending the mapping to the access node using a standardized access node control protocol independent of the access node.

12. The method of claim 8, wherein receiving a subscriber multicast reception request from the access node comprises:
receiving an aggregate multicast group management data from the access node corresponding to the subscriber multicast reception request.

13. The method of claim 12, wherein the aggregate multicast group management data is received on a multicast virtual local area network associated with the retail service provider.

14. The method of claim 8, wherein the access node is independent of the wholesale service provider.

15. A method, comprising:
defining a multicast domain corresponding to a retail service provider and a local loop;
defining a multicast channel lineup corresponding to the multicast domain;
defining a multicast context as an association of the multicast domain and the corresponding multicast channel lineup; and
sending the multicast context to an access node using a standardized access node control protocol from a wholesale service provider gateway in response to a request from a subscriber connected via the local loop.

16. The method of claim 15, further comprising:
instructing the access node to delete the multicast context.

17. The method of claim 15, further comprising:
receiving the multicast context at the access node;
snooping a multicast request message from a subscriber by the access node;
storing the multicast context on the access node; and
deleting the multicast context from the access node responsive instructions from a wholesale service provider gateway.

18. The method of claim 15, further comprising:
sending multicast data from the gateway to the access node; and
replicating the multicast data to subscribers associated with the multicast context.

19. The method of claim 15, wherein the multicast context is defined independent of the nature of the local loop.

20. The method of claim 15, wherein the multicast context is defined independent of how subscriber data is transported between the gateway and the access node.

21. The method of claim 15, wherein the gateway and the access node are connected with a multicast virtual local area network.

22. The method of claim 15, further comprising:
establishing a multicast virtual private network connection between the wholesale service provider gateway and the retail service provider.

23. The method of claim 15, wherein sending the multicast context to an access node using a standardized access node control protocol from a wholesale service provider gateway is performed independent of the nature of the multicast virtual local area network.

* * * * *